Feb. 23, 1932. H. D. ROCHEVILLE 1,846,146
AIRPLANE WING
Filed Oct. 24, 1930  3 Sheets-Sheet 3
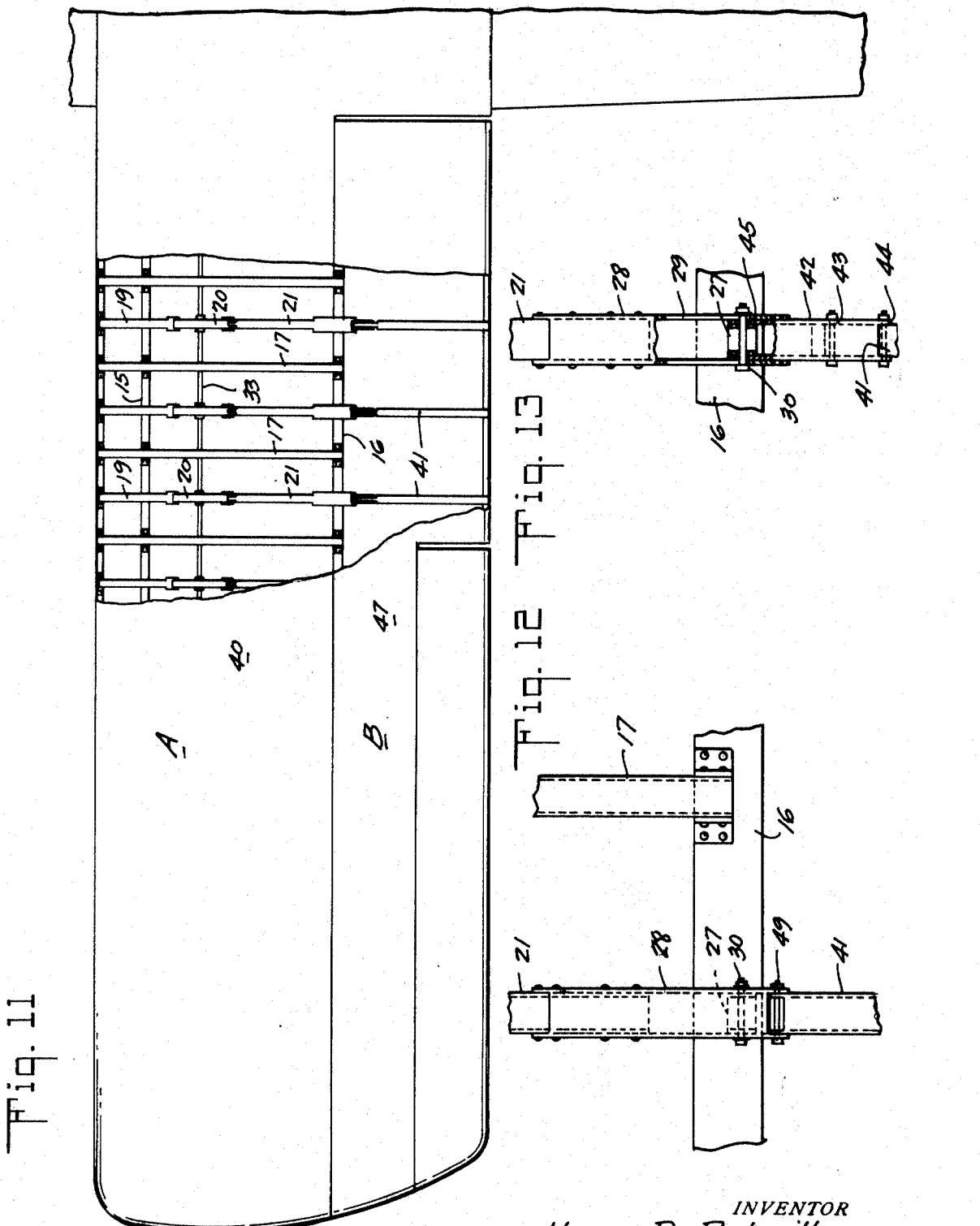
INVENTOR
Harry D. Rocheville
BY Westall and Wallace
ATTORNEYS Patented Feb. 23, 1932

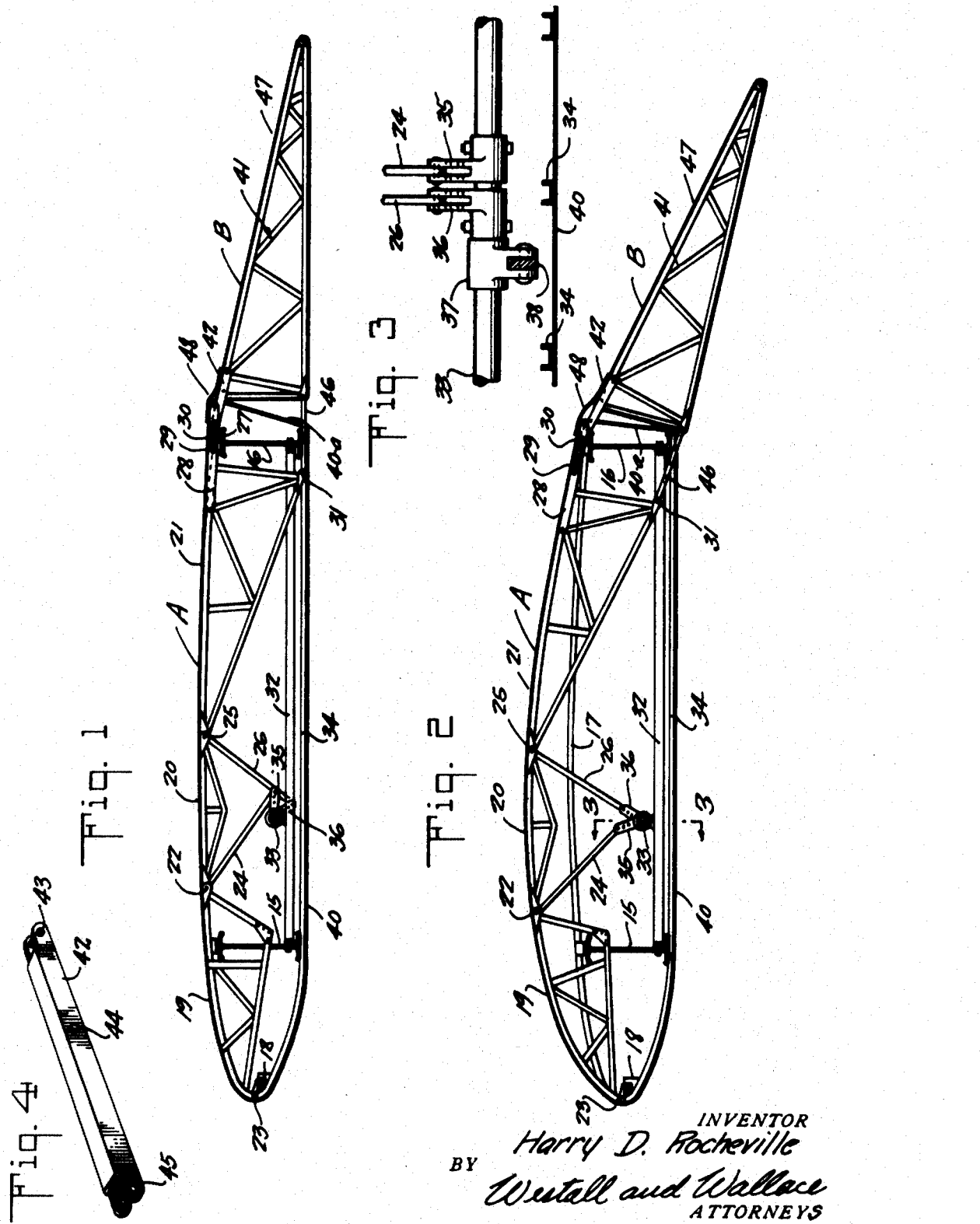

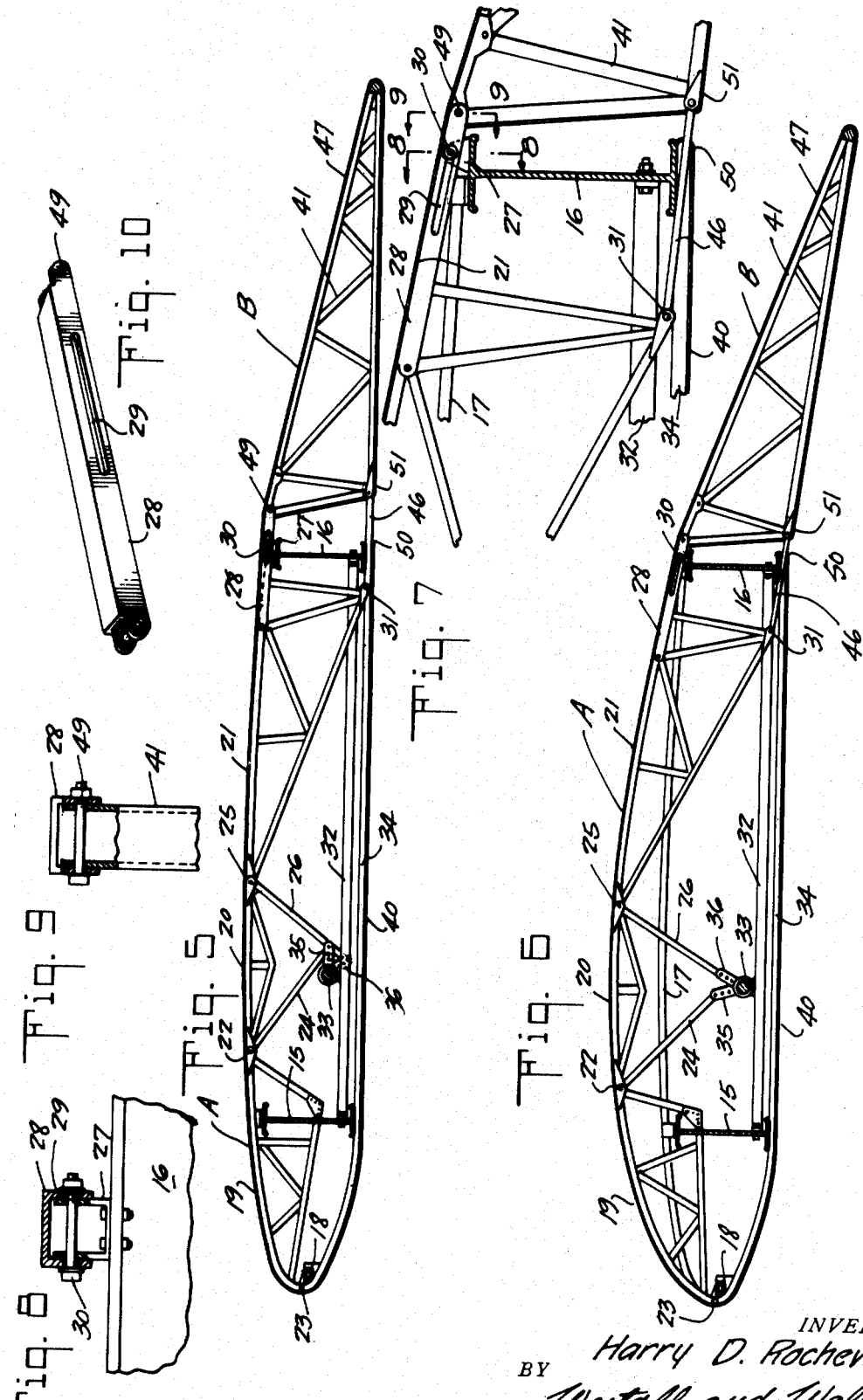

1,846,146

UNITED STATES PATENT OFFICE

HARRY D. ROCHEVILLE, OF LOS ANGELES, CALIFORNIA, ASSIGNOR TO ROCHEVILLE LTD., OF LOS ANGELES, CALIFORNIA, A CORPORATION

AIRPLANE WING

Application filed October 24, 1930. Serial No. 490,908.

This invention relates to a deformable aerofoil whereby the curvature and thickness may be adjusted and pertains especially to an aerofoil having a frame such that the covering therefor will not slide over the ribs and thereby will be maintained taut. The change in wing curve is attained herein by flexing ribs. Another feature of the present invention is the provision of a trailing flap which is connected to the frame so as to be swung by flexure of the flexing ribs.

It is an object of this invention to provide an aerofoil with a frame so constructed as to attain the above mentioned features and whereby it is possible to obtain any standard wing curve desired. Another object of the invention is to provide an aerofoil structure having a trailing flap which may be coupled to obtain a large angle of movement with deformation of the aerofoil or a lesser angular movement.

These objects together with other objects and corresponding accomplishments are obtained by means of the embodiment of my invention illustrated in the accompanying drawings, in which:

Fig. 1 is a fore and aft section through an aerofoil showing a flexible or deformable rib defining a thin curve and with the trailing flap in upper position, being one limit of its shape; Fig. 2 is a fore and aft section similar to Fig. 1 showing the same rib defining a thick curve and with the flap down, being the other limit of its shape; Fig. 3 is an enlarged fragmentary section as seen on the line 3—3 of Fig. 2 showing part of the rib deforming operating mechanism; Fig. 4 is a perspective view of a link for connecting the deformable section of a rib and the flap; Fig. 5 is a section similar to Fig. 1 but showing a modified form of connection of flap and body of a deformable rib; Fig. 6 is a view of the structure shown in Fig. 5 with the aerofoil thickened; Fig. 7 is a fragment of the rib and flap shown in Figs. 5 and 6 on an enlarged scale and showing more in detail the connections between the flap and deformable rib section; Figs. 8 and 9 are sections as seen on the lines correspondingly numbered in Fig. 7; Fig. 10 is a perspective of a slide extension used in mounting the deformable rib on the rear spar; Fig. 11 is a plan view of a fragment of the aerofoil with a portion of the covering broken away to show the ribs; Figs. 12 and 13 are plan views on an enlarged scale of fragments of the deformable ribs shown respectively in Figs. 7 and 1 and showing the link connections between the main body of the deformable ribs and the flaps.

Referring with more particularity to the drawings, and especially Figs. 1 to 4 inclusive 10 and 13, a wing is shown having a deformable fore section indicated generally by A and a pivoted trailing flap or aft section marked B. Referring to the fore section, it is shown built up of alternate rigid and deformable or variable ribs. The specific nature of the rigid rib structure is not shown herein, as it may be of any desirable lattice construction. There is a front spar 15 and a rear spar 16. The upper member of a rigid rib is denoted by 17 in Fig. 2. Between the rigid ribs are the deformable ribs. Both the rigid ribs and the variable ribs are connected to a nose piece 18 forming the entering edge of the wing frame. As shown, the deformable rib is in three articulated sections marked 19, 20 and 21. Front end sections 19 and intermediate sections 20 are connected by pivot pins 22 forming knuckles and sections 19 are pivoted to brackets on the nose piece 18 at 23. Suitable brackets or ears are provided on the sections 19 and 20 for receiving an operating connecting strut 24. Intermediate sections 20 and 21 are connected by pivot pins forming knuckles as indicated by 25 and brackets are provided for a connecting strut 26. Mounted upon the rear spar 16 is a bracket 27 as best shown in Fig. 7 and rear end sections 8. A slide extension 28 shown in detail in Fig. 10 is of channel form to be placed over the upper element of section 21. Extension 28 is provided with a slot 29 receiving a pivot and slide pin 30 mounted in bracket 27 so that the section 21 may pivot and slide upon the pin 30. Sections 19, 20 and 21 have suitable lattice braces forming trusses, and section 21 has at the lower rear of its truss a connector 31 attached thereto. This connector may be a part of the truss formed by the section. Extending between the spars 15 and 16 are sills 32 to support bearing blocks for a shaft 33. On the under side of the spar are rib members 34 which are fixed and complete the framework for the fore section of the wing. Shaft 33 is provided with crank arms 35 and 36. These crank arms are fixedly secured to shaft 33 and are bifurcated to receive the ends of connecting struts 24 and 26. A number of pivot pin holes are provided in the crank arms so that the position of connection of the connecting struts 24 and 26 may be changed and thereby the throw of the struts. An operating crank arm 37 is fixed to shaft 33 and a suitable bar 38 is provided for oscillating the shaft 33. Extension 28 is bolted to the upper member of section 21. The lower portion of the flexible part of the frame is defined by rib members fixed to spars 15 and 16 and maintaining a constant shape for the variable wing section.

Referring to Figs. 1 and 2 it will be noted that with the shaft 33 in position shown in Fig. 1, the struts 24 and 26 are in such a position as to maintain the upper side of the deformable rib in lower position. However, the linear length of the upper section remains the same, the rib section 21 sliding on the spar 16. In the position shown in Fig. 2, the struts are in raised position, and the rib section 21 is forward on the spar. A covering 40 envelopes the fore section and is brought down over the rear of the fore section as indicated by 40a. This section 40a of the covering pivots about the lower edge of the spar 16, as the wing is changed in curvature. In the position shown in Fig. 1, the covering 40 also rests on its upper side upon the fixed ribs 17.

The trailing flap B is built upon a rib structure of lattice form indicated generally by 41. Bolted to the upper forward portion of a rib 41 is a link 42. Bolt holes for securing the link to the ribs of the flap are marked 43 and 44 in Fig. 4. The forward end of link 42 has pivot pin holes 45 to receive pin 30 and thereby pivot or hinge the trailing flap upon the spar. It will be noted that there is no sliding or back and forth movements of the upper section of the trailing flap, there being a relative sliding movement between the fore section and the trailing flap. Link 46 is secured to connector 31 and rib section 21 and is pivotally connected to the lower forward section of trailing flap rib 31. Upon thickening of the deformable ribs from the shape shown in Fig. 1 to that shown in Fig. 2, rib section 21 is moved forwardly as well as swung about pin 30. The result is that connecting link 46 has a compound movement forwardly due to the sliding movement of rib section 21 and that due to the pivotal movement. This causes the trailing flap to be swung through a large angle. With the wing and flap in the shape shown in Fig. 1, a wing curve for speed is provided. With the thick wing shown in Fig. 2 and the flap dropped, the wing has a shape suitable for taking off and for landing. Obviously the wing curvature and angular position of the flap may be changed by moving the bar 38 forwardly and backwardly and this may be effected through suitable intermediate gearing which may be operated by the pilot. It will be noted that the trailing flap B has an independent covering 47 completely enveloping the trailing flap frame. If desired, the opening between the trailing flap section and the fore section of the covering, may be protected by an overlapping covering 48.

In Figs. 5 to 12 inclusive, the fore section of the frame is shown as being identical in structure with the fore section already described. The difference between the form shown and that before described resides in the manner and means of connecting the trailing flap to the fore section. As before described, the trailng flap is hinged upon the spar 16. In the modified form, the upper forward section of the trailing flap frame is connected to the fore section so as to be moved forwardly and backwardly therewith. The link 42 is removed from the ribs on the trailing flap. There are two bolt holes. The link 28 is placed over the upper member on trailing flap rib 41 and a bolt is passed through bolt hole 49 of link 28 and through a bolt hole in the web 41. The connecting link 46 is used as before. It will be noted that the upper section of the trailing flap forms an extension of the fore section of the wing and is substantially rigid with section 21. As section 21 is swung from the position shown in Fig. 5 to that shown in Fig. 6, the traling flap is swung downwardly as a portion of section 21. There is no relative pivotal movement between the fore section and the trailing flap. A less angular movement of the trailing flap is obtained by the construction shown in Figs. 5 and 6 than that shown in Figs. 1 and 2. However, the thickening and thinning of the fore section is identical with that shown in Figs. 1 and 2. It is thus possible by change of a link to obtain a large drop of the trailing flap or a small drop. In the construction shown in Figs. 5 and 6, the covering for the entire aerofoil is started at the lower rear part of the fore section at the point indicated by 50, passed forward over the nose, over the top and continuously over the trailing flap and to the forward lower section of the trailing flap as indicated by 51. In deformation of the aerofoil shape, there will be no relative movement with respect to the frame of the covering in either form. There is not binding or sliding of the covering upon the frame work. The peripheral extent of the frame work remains the same for the portions covered. It will also be noted that the amount of curve change laterally of the aerofoil may be varied by adjusting the throws of the connecting struts.

What I claim is:—

1. An aerofoil having a frame for determining the curvature of the upper side and the thickness of the aerofoil: said frame comprising a rigid frame including a set of fixed ribs for maintaining constant the shape of the lower side; a set of deformable ribs enabling flexure of the upper side of said aerofoil, said deformable ribs being supported by said rigid frame and having a slidable connection thereto for accommodating overall longitudinal movement of said deformable ribs; a trailing flap hingedly connected at its upper side to said frame and a connecting link to swing said flap secured to said deformable ribs and to the lower free side of said flap.

2. An aerofoil having a frame for determining the curvature of the upper side and the thickness of the aerofoil: said frame comprising a rigid frame including a set of fixed ribs for maintaining constant the shape of the lower side; a set of deformable ribs interposed between said fixed ribs enabling flexure of the upper side of said aerofoil, said deformable ribs being supported by said rigid frame and having a slidable connection thereto for accommodating overall longitudinal movement of said deformable ribs; and a covering enveloping the upper side of said frame, the rear thereof and the lower side whereby the rear portion swings with extension and contraction of the deformable ribs.

3. An aerofoil having a frame for determining the curvature of the upper side and the thickness of the aerofoil: said frame comprising a rigid frame including a rear spar, a set of fixed ribs for maintaining constant the shape of the lower side of the aerofoil; a set of deformable ribs interposed between said fixed ribs enabling flexure of the upper side; said deformable ribs being slidably connected to said spar for accommodating overall longitudinal movement of said deformable ribs; a trailing flap hingedly mounted at its upper side on said spar and a connecting link to swing said flap secured to said deformable ribs and to the lower free side of said flap whereby to be moved by expansion and contraction of said deformable ribs and by the swinging of the latter when flexed.

4. An aerofoil having a frame for determining the curvature of the upper side and the thickness of the aerofoil: said frame comprising a rigid frame including a set of fixed ribs for maintaining constant the shape of the lower side; a set of deformable ribs interposed between said fixed ribs enabling flexure of the upper side of said aerofoil, said deformable ribs being supported by said rigid frame and having a slidable connection thereto for accommodating overall longitudinal movement of said deformable ribs; mechanism for flexing said deformable ribs comprising an oscillatable shaft with throw means and connecting struts secured to said throw means and to said deformable ribs; and a trailing flap hingedly connected at its upper side to said frame and a connecting link to swing said flap secured to said deformable ribs and to the lower free side of said flap.

5. An aerofoil having a frame for determining the curvature of the upper side and the thickness of the aerofoil: said frame comprising a rigid frame including a rear spar, a set of fixed ribs for maintaining constant the shape of the lower side; a set of deformable ribs interposed between said fixed ribs enabling flexure of the upper side of said aerofoil, said deformable ribs being slidably connected to said spar for accommodating overall longitudinal movement of said deformable ribs; mechanism for flexing said deformable ribs comprising an oscillatable shaft, crank arms on said shaft and connecting struts secured to said crank arms and to said deformable ribs; a trailing flap hingedly mounted at its upper side on said spar and a connecting link to swing said flap secured to said deformable ribs and to the lower free side of said flap whereby to be moved by expansion and contraction of said deformable ribs and by the swinging of the latter when flexed.

6. An aerofoil having a frame for determining the curvature and the thickness of the aerofoil: said frame having a rear spar, deformable upper ribs slidably mounted on said spar to provide a constant peripheral extent and a covering enveloping said frame whereby the covering follows the variation in curvature of the frame without any sliding movement relative to said frame.

7. An aerofoil having a deformable frame for varying and determining the curvature and the thickness of the aerofoil, said frame comprising a rear spar, deformable upper ribs slidably mounted on the upper part of said spar to provide an outer surface of constant area, and a covering enveloping said frame and hugging the latter whereby the covering follows the variation in curvature of the frame without any sliding movement relative to said frame.

8. An aerofoil having a frame for determining the curvature of the upper side and the thickness of the aerofoil: said frame comprising a rigid frame including a rear spar, a set of fixed ribs for maintaining constant the shape of the lower side; a set of deformable ribs interposed between said fixed ribs enabling flexure of the upper side of said aerofoil, said deformable ribs including end sections and intermediate sections linked together by knuckles, the rear end sections being slidably connected to said spar for accommodating overall longitudinal movement of said deformable ribs and the front end sections being secured to the nose of said frame, and mechanism to adjustably position the knuckles of said intermediate sections and thereby deform the ribs.

9. An aerofoil having a frame for determining the curvature of the upper side and the thickness of the aerofoil: said frame comprising a rigid frame including a set of fixed ribs for maintaining constant the shape of the lower side; a set of deformable ribs interposed between said fixed ribs enabling flexure of the upper side of said aerofoil said deformable ribs including end sections and intermediate sections, the front end sections being supported by said rigid frame at the nose and the rear end sections having a slidable connection to said frame at its rear for accommodating overall longitudinal movement of said deformable ribs; mechanism for flexing said deformable ribs comprising struts secured to said deformable ribs at the knuckles of said intermediate sections, and means to adjustably move said struts and deform the ribs.

10. An aerofoil having a frame for determining the curvature of the upper side and the thickness of the aerofoil: said frame comprising a rigid frame including a set of fixed ribs for maintaining constant the shape of the lower side; a set of deformable ribs interposed between said fixed ribs enabling flexure of the upper side of said aerofoil, said deformable ribs including end sections and intermediate sections linked together by knuckles, the front end sections being supported by said rigid frame at its nose and the rear end sections having a slidable connection to said frame at its rear for accommodating overall longitudinal movement of said deformable ribs; mechanism for flexing said deformable ribs comprising an oscillatable shaft with crank arms and connecting struts secured to said crank arms and to said deformable ribs at the knuckles of the intermediate sections.

11. An aerofoil having a frame for determining the curvature of the upper side and the thickness of the aerofoil: said frame comprising a rigid frame including a rear spar, a set of fixed ribs for maintaining constant the shape of the lower side; a set of deformable ribs interposed between said fixed ribs enabling flexure of the upper side of said aerofoil, said deformable ribs including end sections and intermediate sections linked together by knuckles, the front end sections being secured at the nose of said frame and the rear end sections being slidably connected to said spar for accommodating overall longitudinal movement of said deformable ribs; mechanism for flexing said deformable ribs, comprising an oscillatable shaft, cranks on said shaft, connecting struts secured to said deformable ribs at the knuckles of said intermediate sections, and means adjustably securing said struts to said crank arms to vary the throw.

12. An aerofoil having a frame for determining the curvature of the upper side and the thickness of the aerofoil and a trailing flap rocking on said frame; said frame comprising a rigid frame including a set of fixed ribs for maintaining constant the shape of the lower side; a set of deformable ribs enabling flexure of the upper side of said aerofoil, said deformable ribs including end sections and intermediate sections linked together by knuckles, the front end sections being secured at the nose of said frame and the rear end sections having a slidable connection to said frame at its rear for accommodating overall longitudinal movement of said deformable ribs, struts secured to the knuckles of said intermediate sections, means to adjustably move said struts to deform the ribs and connecting links securing said deformable ribs to said flap to rock the latter upon flexing movement of the deformable ribs.

13. An aerofoil having a frame for determining the curvature of the upper side and the thickness of the aerofoil and a trailing flap rocking on said frame; said frame comprising a rigid frame including a rear spar, a set of fixed ribs for maintaining constant the shape of the lower side; a set of deformable ribs interposed between said fixed ribs enabling flexure of the upper side of said aerofoil, said deformable ribs including end sections and intermediate sections linked together by knuckles, the front end sections being supported at the nose of said frame and the rear end sections being slidably connected to said spar for accommodating overall longitudinal movement of said deformable ribs, struts secured to the knuckles of said intermediate sections, means to adjustably move said struts and thereby deform the ribs, and connecting links securing said deformable ribs to said flap to rock the latter upon flexing movement of the deformable ribs.

14. An aerofoil having a frame for determining the curvature of the upper side and the thickness of the aerofoil and a trailing flap rocking on said frame; said frame comprising a rigid frame including a set of fixed ribs for maintaining constant the shape of the lower side; a set of deformable ribs interposed between said fixed ribs enabling flexure of the upper side of said aerofoil, said deformable ribs including end sections and intermediate sections linked together by knuckles, the front end sections being supported by said rigid frame at the nose thereof and the rear end sections having a slidable connection to said frame at its rear whereby to accommodate overall longitudinal movement of said deformable ribs; mechanism for flexing said deformable ribs comprising an oscillatable shaft with crank arms and connecting struts secured to said crank arms and to said deformable ribs at the knuckles of said intermediate sections, and connecting links securing said deformable ribs to said flap to rock the latter upon flexing movement of the deformable ribs.

15. An aerofoil having a frame for determining the curvature of the upper side and the thickness of the aerofoil and a trailing flap rocking on said frame; said frame comprising a rigid frame including a rear spar, a set of fixed ribs for maintaining constant the shape of the lower side; a set of deformable ribs interposed between said fixed ribs enabling flexure of the upper side of said aerofoil, said deformable ribs being slidably connected to said spar for accommodating overall longitudinal movement of said deformable ribs and said flap being mounted to rock on the upper side of said spar; mechanism for flexing said deformable ribs comprising an oscillatable shaft, crank arms on said shaft, connectting struts secured to said deformable ribs, adjustable means connecting said struts to said crank arms to vary the throw, and connecting links securing said deformable ribs to said flap to rock the latter upon flexing movement of the deformable ribs.

In witness that I claim the foregoing I have hereunto subscribed my name this 11th day of October, 1930.

HARRY D. ROCHEVILLE.